United States Patent
Lee

(10) Patent No.: US 12,455,697 B2
(45) Date of Patent: Oct. 28, 2025

(54) MEMORY SYSTEM AND OPERATING METHOD THEREOF FOR ALLOCATING AND STORING META DATA

(71) Applicant: SK hynix Inc., Gyeonggi-do (KR)

(72) Inventor: Duck Joo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/356,219

(22) Filed: Jul. 21, 2023

(65) Prior Publication Data
US 2024/0264757 A1 Aug. 8, 2024

(30) Foreign Application Priority Data

Feb. 2, 2023 (KR) .......................... 10-2023-0014332

(51) Int. Cl.
G06F 3/06 (2006.01)

(52) U.S. Cl.
CPC ............ G06F 3/064 (2013.01); G06F 3/0658 (2013.01); *G06F 3/0604* (2013.01); *G06F 3/0679* (2013.01)

(58) Field of Classification Search
CPC ...... G06F 3/0604; G06F 3/064; G06F 3/0658; G06F 3/0679
See application file for complete search history.

(56) References Cited

U.S. PATENT DOCUMENTS

| | | | |
|---|---|---|---|
| 9,696,931 B2 * | 7/2017 | Kuttner | G06F 3/0631 |
| 11,194,498 B1 * | 12/2021 | Si | G06F 3/0608 |
| 2011/0106886 A1 * | 5/2011 | Nolterieke | G06F 8/65 709/204 |
| 2014/0325125 A1 * | 10/2014 | Kwon | G06F 3/0616 710/52 |
| 2016/0266795 A1 * | 9/2016 | Woo | G06F 12/0246 |
| 2021/0248075 A1 * | 8/2021 | Lee | G06F 12/0804 |
| 2021/0318957 A1 * | 10/2021 | Jeong | G06F 12/0848 |
| 2024/0176745 A1 * | 5/2024 | Bert | G06F 12/0871 |

FOREIGN PATENT DOCUMENTS

| | | | | |
|---|---|---|---|---|
| KR | 10-2012-0135216 A | 12/2012 | | |
| KR | 10-2021-0033916 A | 3/2021 | | |
| WO | WO-2016191964 A1 * | 12/2016 | ............ | G06F 12/02 |

\* cited by examiner

*Primary Examiner* — Aracelis Ruiz
(74) *Attorney, Agent, or Firm* — IP & T GROUP LLP

(57) ABSTRACT

A memory system includes: a memory device including a plurality of memory blocks each including a plurality of pages; and a memory controller configured to allocate, to a meta page among the plurality of pages, a first region including regions configured to store plural pieces of meta data respectively according to types of the plural pieces of meta data, and a second region configured to store additional meta data corresponding to at least one meta data among the plural pieces of meta data is stored, and control the memory device to store the plural pieces of meta data and the additional meta data in the first region and the second region, respectively.

19 Claims, 9 Drawing Sheets

MEMORY SYSTEM AND OPERATING METHOD THEREOF FOR ALLOCATING AND STORING META DATA

CROSS-REFERENCE TO RELATED APPLICATION

The present application claims priority under 35 U.S.C. § 119(a) to Korean patent application number 10-2023-0014332 filed on Feb. 2, 2023, the entire disclosure of which is incorporated by reference herein.

BACKGROUND

1. Field of Invention

Embodiments of the present disclosure generally relate to an electronic device, and more particularly, to a memory system and an operating method thereof.

2. Description of Related Art

A memory system stores data under the control of a host device such as a computer or a smart phone. The memory system may include a memory device for storing data and a memory controller for controlling the memory device. The memory device may be a volatile memory device or a nonvolatile memory device.

The nonvolatile memory device may retain data stored therein even when the supply of power is interrupted. Nonvolatile memory devices may include a Read Only Memory (ROM), a Programmable ROM (PROM), an Electrically Programmable ROM (EPROM), an Electrically Erasable ROM (EEROM), a flash memory, and the like.

A firmware (FW) update is performed based on meta data stored in a meta page included in the memory device in response to an FW update request. The meta page stores several pieces of meta data according to a set layout. New meta data may be added in a process of performing the FW update, and reserved spaces are allocated to the meta page to store the new meta data in the meta page. When no meta data is stored in such a reserved space, waste of a storage space may occur. When meta data are stored fully in the reserved space, it may be difficult to store new meta data while maintaining the layout of the meta page.

SUMMARY

Embodiments of the present disclosure provide a memory system capable of storing added meta data regardless of types of the added meta data and using the stored meta data, and an operating method of the memory system.

In accordance with an aspect of the present disclosure, there is provided a memory system including: a memory device including a plurality of memory blocks each including a plurality of pages; and a memory controller configured to allocate, to a meta page among the plurality of pages, a first region including regions configured to store plural pieces of meta data respectively according to types of the plural pieces of meta data, and a second region configured to store additional meta data corresponding to at least one meta data among the plural pieces of meta data, and control the memory device to store the plural pieces meta data and the additional meta data in the first region and the second region, respectively.

In accordance with another aspect of the present disclosure, there is provided a memory system including: a nonvolatile memory device including a meta page including a dedicated region configured to classify and store the plural pieces of meta data according to the types of the meta data and a common region configured to store additional meta data corresponding to the plural pieces of meta data stored in the dedicated region; a read buffer configured to temporarily store a plural pieces of meta data stored in the meta page; a plurality of meta data storages configured to classify and store the plural pieces of meta data stored in the read buffer according to types of the plural pieces of meta data; and a memory controller configured to control the nonvolatile memory device, the read buffer, and the plurality of meta data storages.

In accordance with still another aspect of the present disclosure, there is provided a method of operating a memory controller, the method including: reading data stored in a meta page in a first memory device, the meta page including a dedicated region configured to store plural pieces of meta data and a common region configured to store additional meta data corresponding to the plural pieces of meta data; storing the plural pieces of meta data stored in the dedicated region respectively in allocated regions, according to types of the plural pieces of meta data; and storing the additional meta data stored in the common region in the allocated regions, according to the types of the plural pieces of meta data.

BRIEF DESCRIPTION OF THE DRAWINGS

Example embodiments of the present disclosure will now be described more fully hereinafter with reference to the accompanying drawings; however, the examples may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
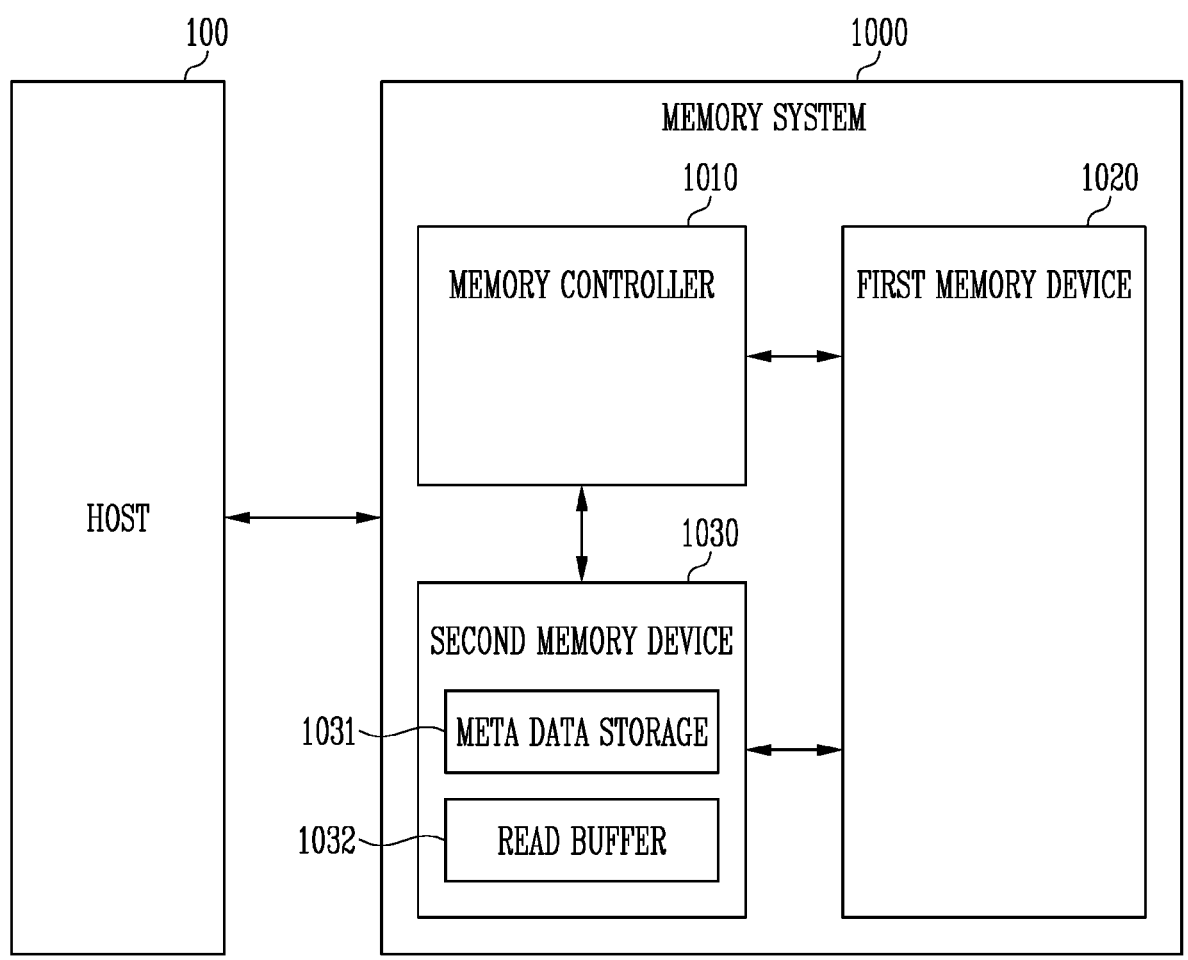
FIG. 1 is a diagram illustrating a memory system in accordance with an embodiment of the present disclosure.

FIG. 1 is a diagram illustrating a memory system 1000 in accordance with an embodiment of the present disclosure.

Referring to FIG. 1, the memory system 1000 may include a memory controller 1010, a first memory device 1020, and a second memory device 1030.

The memory system 1000 may be connected to a host 100. The host 100 may include a mobile phone, a smartphone, a laptop computer, a desktop computer, a game console, a TV, a tablet PC, an in-vehicle infotainment system, a drone, an autonomous vehicle, or the like. The host 100 may control the memory system 1000 to store data in the first memory device 1020.

The memory system 1000 may be manufactured as any of various types of storage devices according to a host interface used as a communication scheme with the host 100.

For example, the memory system 1000 may be configured as any of a variety of types of storage devices, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) storage device, a Universal Flash Storage (UFS) device, a personal computer memory card international association (PCMCIA) card type storage device, a peripheral component interconnection (PCI) card type storage device, a PCI express (PCI-E) card type storage device, a Compact Flash (CF) card, a Smart Media Card (SMC), and a memory stick.

The host interface includes a protocol for performing data communication between the host 100 and the memory controller 1010. For example, the memory controller 1010 may communicate with the host 100 through at least one of various interface communication standards or protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA (SATA) protocol, a Parallel-ATA (PATA) protocol, a Small Computer System Interface (SCSI) protocol, an Enhanced Small Disk Interface (ESDI) protocol, an Integrated Drive Electronics (IDE) protocol, a System Management Bus (SMBus) protocol, an Inter-Integrated Circuit (I2C) protocol, and an Improved Inter-Integrated Circuit (I3C) protocol.

The memory system 1000 may be manufactured as any of various package types. For example, the memory system 1000 may be manufactured as any of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The first memory device 1020 may store data. The first memory device 1020 may be a nonvolatile memory device. The first memory device 1020 operates under the control of the memory controller 1010.

The first memory device 1020 may include a memory cell array (not shown) including a plurality of memory cells for storing data. The memory cell array may include a plurality of memory blocks (not shown). Each memory block may include a plurality of memory cells. One memory block may include a plurality of pages. In an embodiment, the page may be unit for storing data in the first memory device 1020 or reading data stored in the first memory device 1020. The memory block may be a unit for erasing data. In an embodiment, the first memory device 1020 may be a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the first memory device 1020 is a NAND flash memory is described.

In an embodiment, the first memory device 1020 may be implemented in a three-dimensional array structure. The present disclosure may be applied to not only a flash memory device in which a charge storage layer is configured with a conductive floating gate (FG) but also a charge trap flash (CTF) in which a charge storage layer is configured with an insulating layer.

In an embodiment, each of the memory cells included in the first memory device 1020 may be configured as a Single Level Cell (SLC) capable of storing one data bit. Further, each of the memory cells included in the first memory device 1020 may be configured as a Multi-Level Cell (MLC) capable of storing two data bits, a Triple Level Cell (TLC) capable of storing three data bits, or a Quad Level Cell (QLC) capable of storing four data bits.

The first memory device 1020 may receive a command and an address from the memory controller 1010 and access a region indicated by the address in the memory cell array. That is, the first memory device 1020 may perform an operation corresponding to the command on the region indicated by the address. For example, the first memory device 1020 may perform a write operation (i.e., a program operation), a read operation, and an erase operation. In the program operation, the first memory device 1020 may program data in the region indicated by the address. In the read operation, the first memory device 1020 may read data from the region indicated by the address. In the erase operation, the first memory device 1020 may erase data stored in the region indicated by the address.

The memory controller 1010 may control operations of the memory system 1000.

The second memory device 1030 may include a meta data storage 1031 and a read buffer 1032.

The read buffer 1032 may serve as a buffer memory for temporarily storing data which the memory controller 1010 reads from the first memory device 1020. Since the memory controller 1010 performs a read operation in units of pages, data may be stored in the read buffer 1032 in units of pages.

In an embodiment, the read buffer 1032 may temporarily store meta data read from a meta page in the first memory device 1020. The meta data may be stored in units of pages, and a page assigned to store the meta data may be referred to as a meta page. The meta data may include map data, a read count, an erase count, and a meta data log. The meta data may be referred to as system data.

The meta data storage 1031 may classify and store meta data temporarily stored in the read buffer 1032, according to types of the meta data. The meta data storage 1031 may include a first meta data storage, a second meta data storage, a third meta data storage, and the like, which are classified according to types of meta data.

In an embodiment, a first meta data storage may store map data, a second meta data storage may include a read count, a third meta data storage may store an erase count, and a fourth meta data storage may store a meta data log. However, the present disclosure is not limited to this embodiment.

Figure 2:
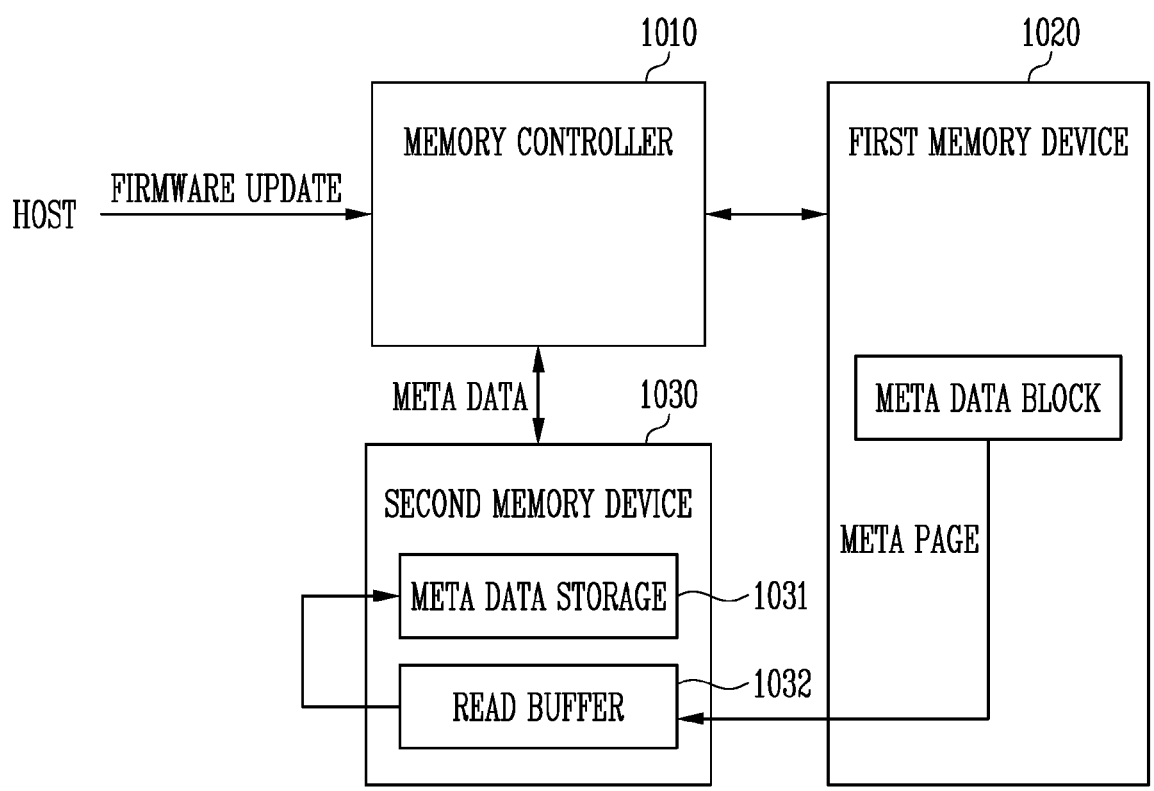
FIG. 2 is a diagram for describing an operation of a memory controller in accordance with an embodiment of the present disclosure.

FIG. 2 is a diagram for describing an operation of the memory controller 1010 in accordance with an embodiment of the present disclosure.

FIG. 2 shows an operation in which the memory controller 1010 controls the first memory device 1020 and the second memory device 1030.

When power is applied to the memory system 1000, the memory controller 1010 may execute firmware (FW). When the first memory device 1020 is a flash memory device, the memory controller 1010 may 1010 may execute FW such as a Flash Translation Layer (FTL) for controlling communication between the host 100 and the first memory device 1020.

In an embodiment, the memory controller 1010 may receive data and a Logical Block Address (LBA) from the host 100, and translate the LBA into a Physical Block Address (PBA) representing an address of memory cells included in the first memory device 1020, in which the data is to be stored. Further, the memory controller 1010 may store, in the second memory device 1030, a logical-physical address mapping table representing a mapping relationship between the LBA and the PBA.

The memory controller 1010 may control the first memory device 1020 to perform a program operation, a read operation, an erase operation, or the like according to a request of the host 100. In the program operation, the memory controller 1010 may provide the first memory device 1020 with a program command, a PBA, and data. In the read operation, the memory controller 1010 may provide the first memory device 1020 with a read command and a PBA. In the erase operation, the memory controller 1010 may provide the first memory device 1020 with an erase command and a PBA.

The memory controller 1010 may control data communication between the host 100 and the second memory device 1030. Alternatively, the memory controller 1010 may temporarily store system data for controlling the first memory device 1020 in the second memory device 1030. For example, the memory controller 1010 may temporarily store data input from the host 100 in the second memory device 1030, and then transmit the data temporarily stored in the second memory device 1030 to the first memory device 1020.

In various embodiments, the second memory device 1030 may serve as a working memory or a cache memory of the memory controller 1010. The second memory device 1030 may store codes or commands, which the memory controller 1010 executes. Alternatively, the second memory device 1030 may store data processed by the memory controller 1010. The second memory device 1030 may be a volatile memory.

In an embodiment, the second memory device 1030 may be implemented as a dynamic random access memory (DRAM) such as a Double Data Rate Synchronous Dynamic Random Access Memory (DDR SDRAM), a DDR4 SDRAM, a Low Power Double Data Rate4 (LPDDR4) SDRAM, a Graphics Double Data Rate (GDDR) SDRAM, a Low Power (LPDDR) SDRAM, or a Rambus Dynamic Random Access Memory (RDRAM), or a Static Random Access Memory (SRAM).

The first memory device 1020 may include a meta data block for storing meta data. The meta data may mean data used for operating the memory system 1000 shown in FIG. 1. The meta data may include map data (i.e., address mapping associated data) MAP_DATA, host data HOST_DATA, firmware associated data FW_DATA, a read count, bad block information, garbage collection information, word line information, booting information, sudden power off (SPO) information, or the like. The first memory device 1020 may include a plurality of meta data blocks.

Meta data may be stored in a meta data block in units of pages. Pages included in the meta data block may correspond to meta pages. The meta page may store one or more types of meta data. For example, a single meta page may store only map data MAP_DATA. In another example, a single meta page may store map data MAP_DATA, host data HOST_DATA, and firmware associated data FW_DATA. Meta data may be stored in a meta page configured with Single Level Cells (SLCs).

The memory controller 1010 may control the first memory device 1020 to read meta data stored in a meta page in the first memory device 1020, and may store the read meta data in the read buffer 1032 included in the second memory device 1030, for example, in response to a firmware update request of the host 100. Further, when the memory system 1000 shown in FIG. 1 is booted, the memory controller 1010 may read a meta data from the first memory device 1020 and may store the read meta data into the read buffer 1032.

The memory controller 1010 may control the second memory device 1030 to store, in the meta data storage 1031, the meta data stored in the read buffer 1032. The memory controller 1010 may classify meta data stored in the read buffer 1032 according to types of the meta data and store the classified meta data in the meta data storage 1031. The meta data storage 1031 may include a first meta data storage, a second meta data storage, and a third meta data storage, which classify and store meta data according to types of the meta data. The number of meta data storages classified according to types of meta data may vary according to a design.

When additional meta data is input from the host 100, the memory controller 1010 may control the second memory device 1030 to store the additional meta data therein. For example, when additional meta data corresponding to meta data is stored in the first meta data storage, the memory controller 1010 may control the second memory device 1030 to store the additional meta data in the first meta data storage.

The memory controller 1010 may update firmware, based on the meta data stored in the meta data storage 1031. The memory controller 1010 may generate a new meta page, based on the meta data stored in the meta data storage 1031. Based on additional meta data input from the host 100, the memory controller 1010 may update the meta data, store the additional meta data in the existing meta page, or generate a new meta page.

Figure 3:
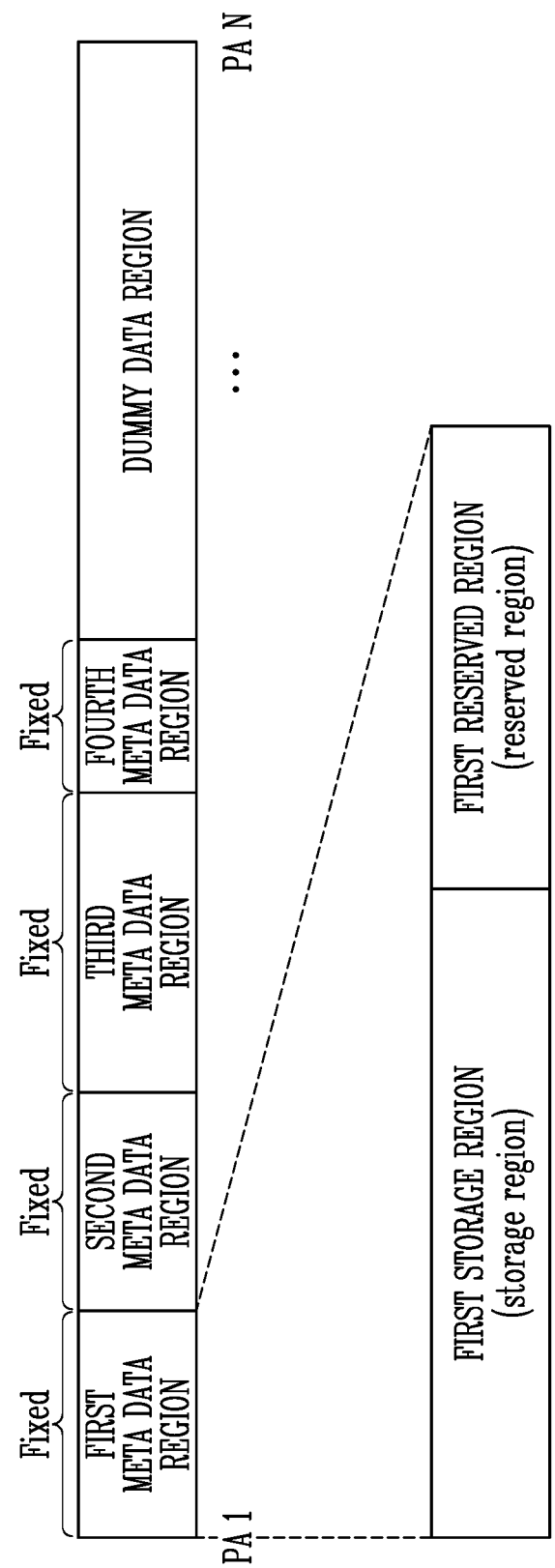
FIG. 3 is a diagram illustrating a layout of a type of meta page that has been proposed.

FIG. 3 is a diagram illustrating a layout of a type of meta page that has been proposed.

Referring to FIG. 3, the meta page may include a first meta page region storing first meta data, a second meta page region storing second meta data, a third meta page region storing third meta data, and a fourth meta page region storing fourth meta data. The number of meta data regions may vary according to types of meta data to be stored.

The meta data regions may be pre-allocated regions according to types of meta data to be stored. For example, the first meta data region may be a region in which map data MAP_DATA is stored. In another example, the second meta data region may be a region in which a read count is stored. The first meta data region may be configured with a first storage region in which the first meta data is stored and a first reserved region as a region in which additional first meta data is to be stored. The first reserved region may be in a state in which no data is stored.

The meta data regions may have a fixed size. Each of the meta data regions may include a storage region in which meta data are stored and a reserved region allocated as a preliminary space. The sum of sizes of a storage region and a reserved region, which are included in each meta data region, may be constant.

In an embodiment, when additional meta data corresponding to a storage region in the first meta data region is input, the input additional meta data may be stored in a reserved region in the first meta data region. The size of the storage region in the first meta data region may increase, and the size of the reserved region in the first meta data region may decrease.

Like the above-described first meta data region, each of the second meta data region, the third meta data region, and the fourth meta data region may include a storage region and a reserved region.

A region other than the meta data regions may be a dummy data region. In the dummy data region, arbitrary data may be stored to secure a space. When the sum of sizes of meta data regions allocated to one meta page is less than a size of the meta page, a dummy data region may be generated.

Since the meta page includes a reserved region corresponding to each meta data, waste of a storage space may occur when no additional meta data is input. Since a read operation on data is performed in units of pages, an unnecessary read operation on a reserved region corresponding to each meta data may be accompanied when a meta page including the reserved regions is read.

In addition, when meta data are stored fully in one meta data included in the meta page, no meta data can be stored while maintaining the layout of the meta page, when an additional meta data is to be stored. For example, when additional meta data corresponding to meta data is input in a state in which the corresponding meta data are stored fully in a pre-allocated first meta data region, the additional meta data may be stored in a first meta data region allocated to a new meta page. An additional read operation is to be accompanied to load meta data stored in the new meta page, and therefore, the layout of the meta page needs to be improved.

Figure 4A:
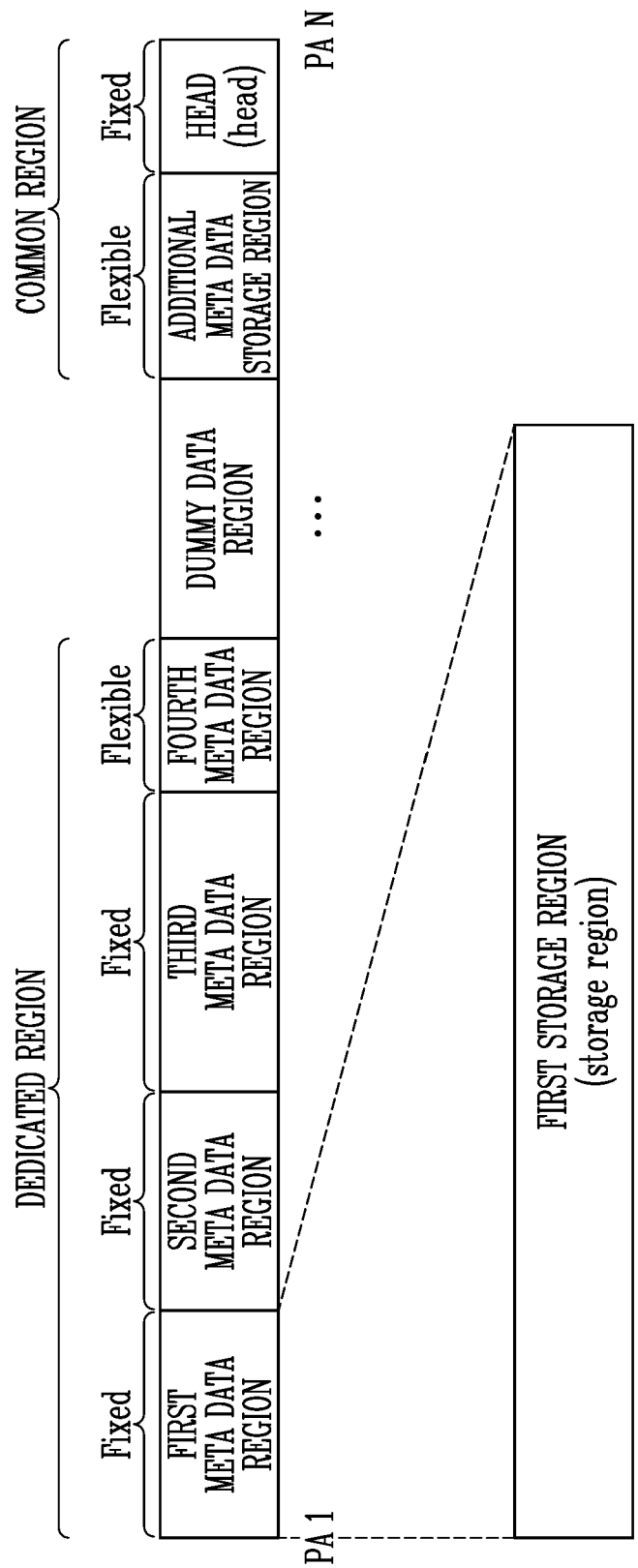
FIG. 4A is a diagram illustrating a layout of a meta page in accordance with an embodiment of the present disclosure.

FIG. 4A is a diagram illustrating a layout of a meta page in accordance with an embodiment of the present disclosure.

FIG. 4A shows a layout of a meta page to which a common region is allocated.

The meta page in accordance with an embodiment of the present disclosure may include a dedicated region and a common region. The dedicated region may include meta data regions respectively allocated according to types of meta data. The common region may include an additional meta data storage region in which added meta data are stored and a head region for storing information on the added meta data. The number of meta data regions included in the dedicated region may vary according to the number of types of meta data.

Unlike the meta page shown in FIG. 3, each of meta data regions may not include any reserved region. For example, a first meta data region may be configured with only a first storage region. That is, each of the meta data regions may be configured with only a storage region. For example, the first meta data region may correspond to the first storage region in which first meta data are stored.

The meta data regions respectively allocated according to the types of the meta data may have a constant size. Sizes of the meta data regions may be different from each other according to the types of the meta data. For example, a size of a meta data region corresponding to meta data which is frequently updated or is frequently added may have a value greater than a size of a meta data region corresponding to another meta data.

Referring to FIG. 4A, the size of a meta data region corresponding to a highest address of the dedicated region among the meta data regions included in the dedicated region may be changed. For example, the size of a fourth meta data region corresponding to the highest address of the dedicated region may be changed. When additional meta data corresponding to fourth meta data is input, the input additional meta data may be stored in a direction in which an address increases from a region in which the address is highest in the fourth meta data region. The size of a dummy data region may decrease, and the size of the fourth meta data region may increase.

The common region may include a head region having a fixed size and an additional meta data storage region of which size is changeable. The head region may be allocated in a direction toward a low address from a highest physical address PA N among physical addresses corresponding to the corresponding meta page. The additional meta data storage region may be allocated in a direction toward a lowest physical address among the physical addresses corresponding to the meta page from a lowest physical address among physical addresses corresponding to the head region.

The head region may store information on additional meta data stored in the additional meta data storage region. The information on the additional meta data may include address information, effective information, or size information.

The additional meta data storage region may store added meta data. The additional meta data storage region may store the added meta data in a direction toward a low address from a region of which address is high, regardless of the types of the added meta data. For example, when additional meta data corresponding to first meta data is to be stored, the additional meta data corresponding to the first meta data may be stored in a direction in which an address becomes low from an address at which the head region starts.

Unlike the meta data regions included in the meta page shown in FIG. 3, no reserved region is allocated to each of the meta data regions included in the meta page shown in FIG. 4A. Therefore, when new meta data is stored, added meta data may be stored in the additional meta data storage region. In addition, information on the added meta data may be stored in the head region.

When additional meta data corresponding to fourth meta data is input, the added meta data may not be stored in the common region. Since the size of the fourth meta data region is variable, added meta data corresponding to the fourth meta data may be stored in a direction in which a physical address increases from a highest physical address among physical addresses corresponding to the fourth meta data region.

A region between the dedicated region and the common region may be a dummy data region.

For convenience of description, four meta data regions are mainly described. However, the present disclosure is not limited to this embodiment.

Figure 4B:
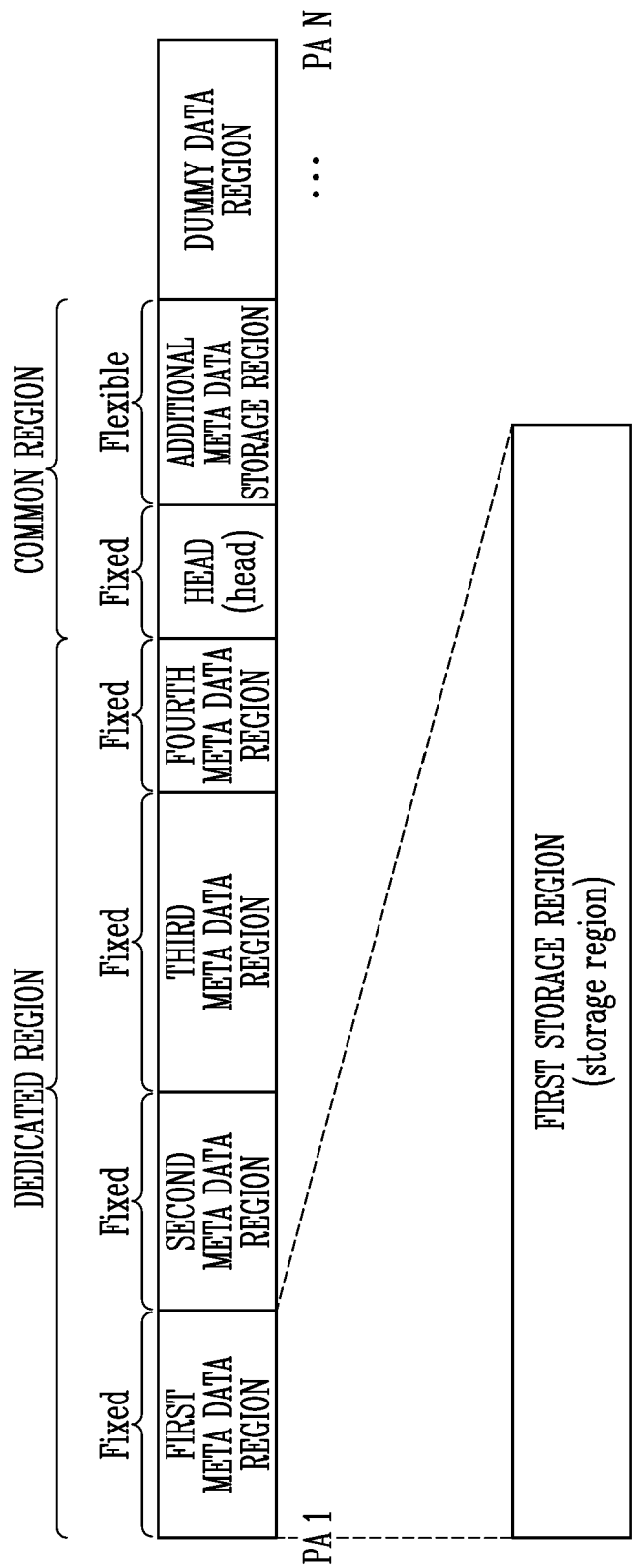
FIG. 4B is a diagram illustrating a layout of a meta page in accordance with another embodiment of the present disclosure.

FIG. 4B is a diagram illustrating a layout of a meta page in accordance with another embodiment of the present disclosure.

Unlike the meta page shown in FIG. 4A, sizes of meta data regions included in a dedicated region of the meta page shown in FIG. 4B may all have fixed values. For example, the size of a fourth meta data region corresponding to a highest address of the dedicated region may also have a fixed value, in addition to a first meta data region, a second meta data region, and a third meta data region.

A common region may include a head region having a fixed size and an additional meta data storage region of which size is changeable.

Unlike the meta page shown in FIG. 4A, the common region of the meta page shown in FIG. 4B may be allocated in a direction in which a physical address increases from a next address of a highest physical address among physical addresses corresponding to the fourth meta data region. The head region may be allocated in a direction in which a physical address increases from the next address of the highest physical address among the physical addresses corresponding to the fourth meta data region among physical addresses corresponding to the meta page. The additional meta data storage region may be allocated in a direction towards a highest physical address among the physical addresses corresponding to the meta page from a next address of a highest physical address among physical addresses corresponding to the head region.

The additional meta data storage region may store added meta data. The meta page shown in FIG. 4B may sequentially store additional meta data in the additional meta data storage region, regardless of the types of the added meta data. The additional meta data may be sequentially stored in a direction in which an address increases from a low address.

Unlike the meta page shown in FIG. 3, no reserved region is allocated to each of the meta data regions of the meta page shown in FIG. 4B. Therefore, when new meta data is added, the added meta data may be stored in the additional meta data storage region. In addition, information on the added meta data may be stored in the head region. For example, when first additional meta data and third additional meta data are sequentially input, the first additional meta data may be stored in a direction toward a high physical address from a lowest physical address among physical addresses corresponding to the additional meta data storage region. After the first additional meta data is stored, and the third additional meta data may be stored in a direction toward a high physical address.

Unlike the meta page shown in FIG. 4A, when additional meta data corresponding to fourth meta data is input, the additional meta data may be stored in the common region.

Figure 5:
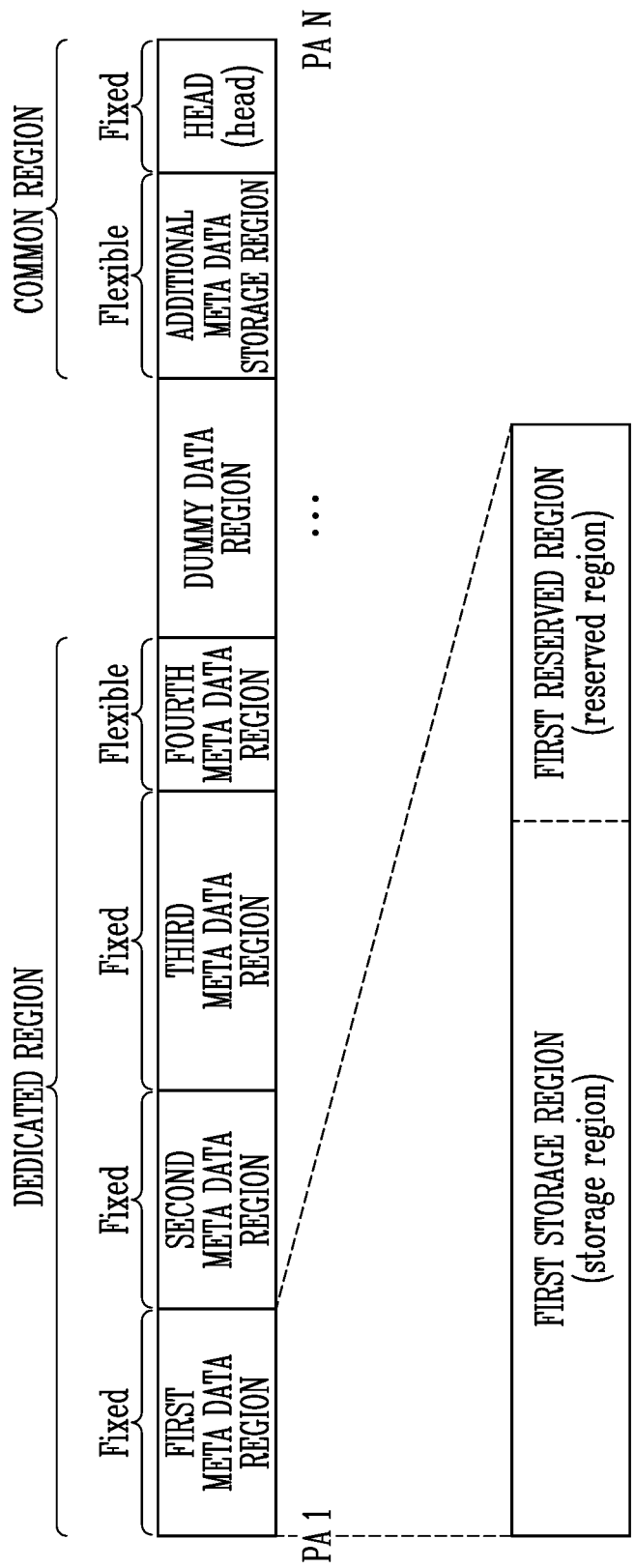
FIG. 5 is a diagram illustrating a layout of a meta page in accordance with another embodiment of the present disclosure.

FIG. 5 is a diagram illustrating a layout of a meta page in accordance with another embodiment of the present disclosure.

Referring to FIG. 5, a layout of a meta page including a dedicated region and a common region, which are configured with meta data regions each including a storage region and a reserved region is illustrated.

Like the meta page shown in FIG. 4A, the dedicated region of the meta page shown in FIG. 5 may be configured with meta data regions respectively allocated according to types of meta data. The size of each of the meta data regions may be constant. The size of each of the meta data regions may vary according to types of meta data.

Unlike the meta page shown in FIG. 4A, each of the meta data regions included in the meta page shown in FIG. 5 may include a storage region and a reserved region.

When additional meta data to be stored is input, the additional meta data may be stored in a reserved region in a preferentially corresponding meta data region.

When meta data are stored fully in the reserved region of each meta data region as additional meta data which are stored fully in the reserved region, subsequent input additional meta data may be stored in the common region.

When a meta page is generated, the memory controller 1010 shown in FIG. 2 may check whether any reserved region in which additional meta data can be stored exists. When an additional meta data is input, the memory controller 1010 may check a reserved region of a meta data region corresponding to the additional meta data. When data can be stored in the reserved region, the memory controller 1010 may store the data in the reserved region. When no data can be stored in the reserved region, the memory controller 1010 may store the additional meta data in an additional meta data storage region. When the additional meta data is stored in the additional meta data storage region, information on the stored data may be stored in a head region.

Figure 6:
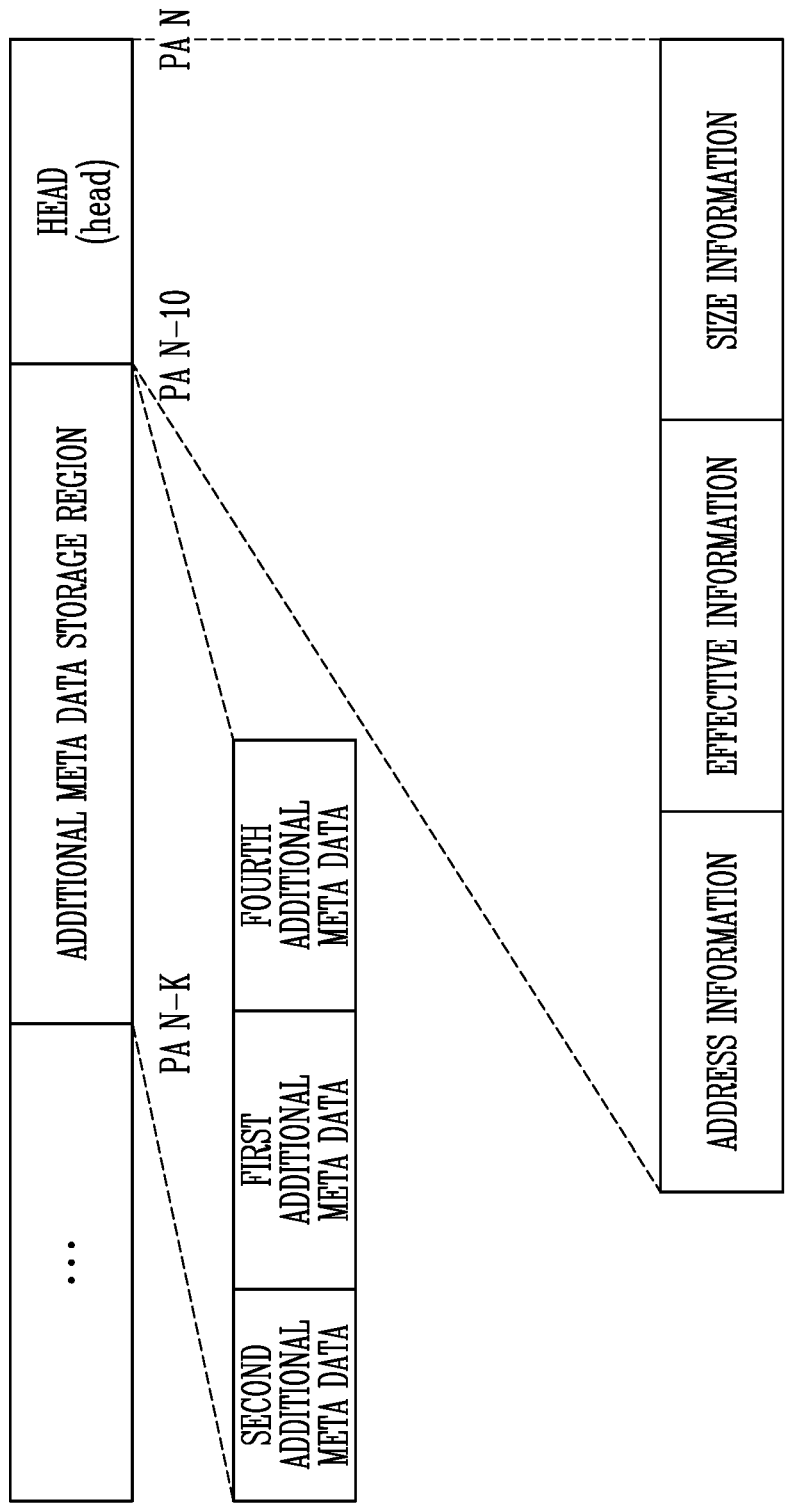
FIG. 6 is a diagram illustrating a common region in a meta page in accordance with an embodiment of the present disclosure.

FIG. 6 is a diagram illustrating a common region in a meta page in accordance with an embodiment of the present disclosure.

Referring to FIG. 6, information on additional meta data stored in a head region and a configuration of an additional meta data storage region are illustrated.

Information on meta data stored in the additional meta data storage region may be stored in the head region. Information on additional meta data may include address information, effective information, and size information.

The effective information may include information capable of identifying that a meta page is an effective meta page.

The size information may be information on a size of the additional meta data storage region. The size of the additional meta data storage region may be a difference value of addresses of regions in which the additional meta data are stored. As additional meta data are stored in the additional meta data storage region, the size of the additional meta data storage region may be changed. Therefore, the size information stored in the head region may be changed as additional meta data is stored.

The address information may include information on a physical address of meta data stored in the additional meta data storage region. The address information may include at least one of a lowest start address and a highest end address, which correspond to the additional meta data storage region. As shown in FIG. 6, the address information may include at least one of PA N-K as the lowest address corresponding to the additional meta data storage region and PA N-10 as the highest address corresponding to the additional meta data storage region.

Further, the address information may include address information of each region classified according to the type of meta data stored in the additional meta data storage region. When second, first, and fourth additional meta data are stored in the additional meta data storage region as shown in FIG. 6, the address information may include at least one of a start address and an end address of a region in which the second additional meta data is stored, at least one of a start address and an end address of a region in which the first additional meta data is stored, and at least one of a start address and an end address of a region in which the fourth additional meta data is stored.

Information on additional meta data stored in the head region may be updated whenever new additional meta data is stored in a corresponding meta page.

In accordance with an embodiment of the present disclosure, when the memory controller 1010 stores data stored in the additional meta data storage region in the meta data storage 1031, the memory controller 1010 may check effective information. The effective information may include information representing that a meta page is an effective meta page.

For example, when the memory controller 1010 generates a meta page, the memory controller 1010 may store predetermined data capable of identifying that the meta page is an effective meta page in a head region of the meta page. In accordance with an embodiment of the present disclosure, when the memory controller 1010 stores data stored in the additional meta data storage region in the meta data storage 1031, the memory controller 1010 may check size information. The memory controller 1010 checks the size information, thereby acquiring information on the size of the additional meta data storage region.

In accordance with an embodiment of the present disclosure, when the memory controller 1010 stores data stored in the additional meta data storage region in the meta data storage 1031, the memory controller 1010 may check address information. The memory controller checks the address information, thereby acquiring address information on positions of additional meta data to be read in the meta page.

Figure 7:
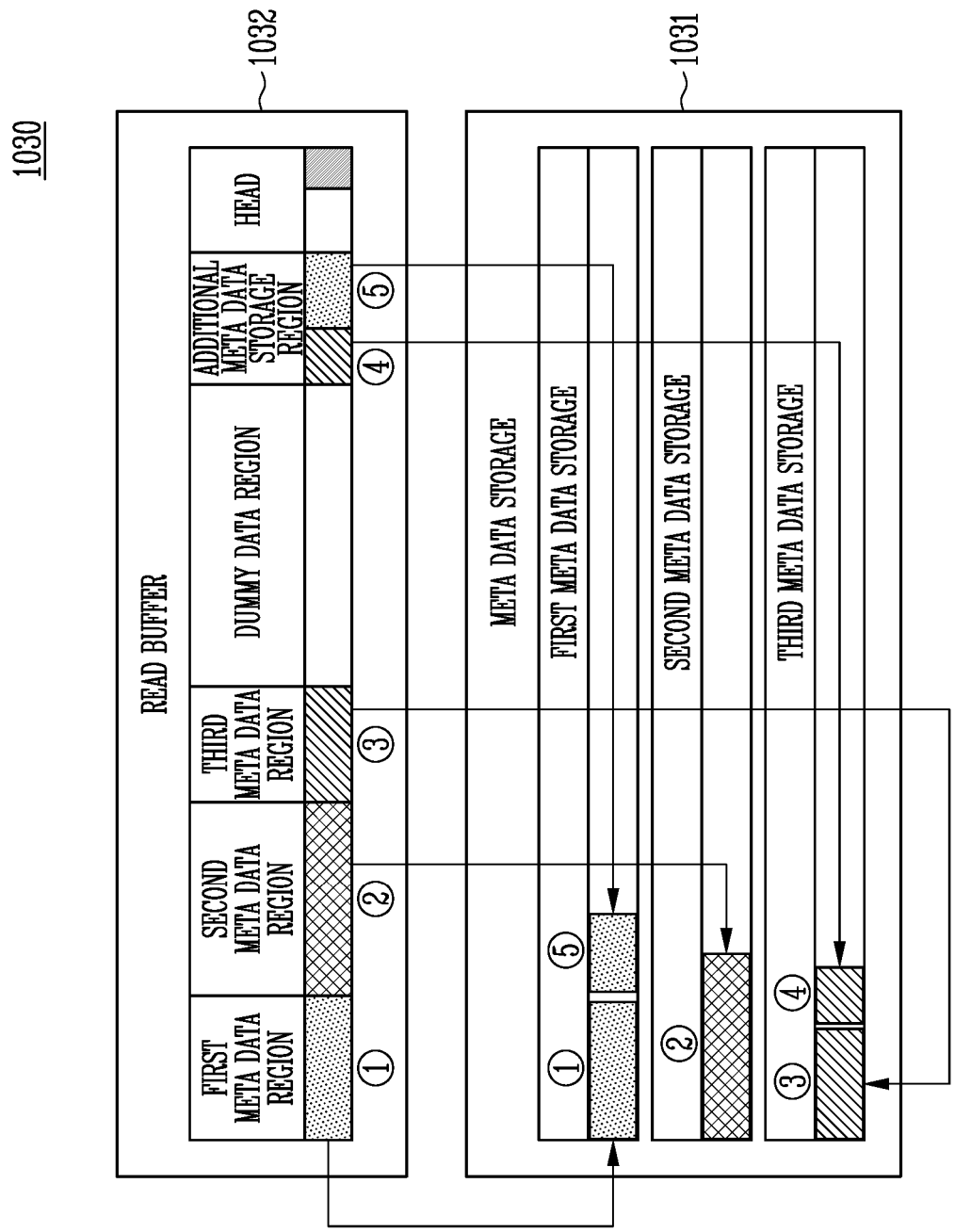
FIG. 7 is a diagram for describing a process of storing meta data in accordance with an embodiment of the present disclosure.

FIG. 7 is a diagram for describing a process of storing meta data in accordance with an embodiment of the present disclosure.

Referring to FIG. 7, a process of storing, in the meta data storage 1031, meta data stored in a meta page stored in the read buffer 1032 is illustrated.

When the memory system is booted, the memory controller 1010 shown in FIG. 2 may control the first memory device 1020 to read a first meta page included in the first memory device 1020 and to temporarily store the read first meta page in the read buffer 1032. The first meta page may include a first meta data region in which first meta data is stored, a second meta data region in which second meta data is stored, a third meta data region in which third meta data is stored, an additional meta data storage region in which added meta data are stored, and a head region in which information on additional meta data is stored.

The memory controller 1010 may store, in the meta data storage 1031, meta data in the meta page stored in the read buffer 1032 according to types of the meta data. The meta data storage 1031 may include a first meta data storage which stores only the first meta data, a second meta data storage which stores only the second meta data, and a third meta data storage which stores only the third meta data. The memory controller 1010 may control the second memory device 1030 to store, in the first meta data storage, meta data stored in the first meta data region. The memory controller 1010 may control the second memory device 1030 to store, in the second meta data storage, meta data stored in the second meta data region. The memory controller 1010 may control the second memory device 1030 to store, in the third meta data storage, meta data stored in the third meta data region.

Subsequently, the memory controller 1010 may control the second memory device 1030 to store, in the meta data storage 1031, meta data stored in the additional meta data storage region, based on information stored in the head region.

The memory controller 1010 may check a size of the additional meta data storage region, based on size information stored in the head region. The memory controller 1010 may check an address of a region in which first additional meta data is stored, based on address information stored in the head region. The memory controller 1010 may identify whether a page in which the first additional meta data is stored is an effective meta page, based on effective information stored in the head region. The memory controller 1010 may control the second memory device 1030 to store the first additional meta data in the first meta data storage.

The memory controller 1010 may check an address of a region in which third additional meta data is stored, based on the address information stored in the head region. The memory controller 1010 may identify whether a page in which the third additional meta data is stored is an effective meta page, based on the effective information stored in the head region. The memory controller 1010 may control the second memory device 1030 to store the third additional meta data in the first meta data storage.

After that, the memory controller 1010 may perform an operation in response to a request of the host 100, based on the meta data stored in the meta data storage 1031. For example, the memory controller 1010 may control the second memory device 1030 to store map data MAP_DATA in the meta data storage 1031, and then update the map data MAP_DATA about data input from the host 100. The memory controller 1010 may 1010 may control the second memory device 1030 to store the updated map data MAP_DATA in the meta data storage 1031.

The memory controller 1010 may control the first memory device 1020 and the second memory device 1030 to generate a new meta page, based on the meta data stored in the meta data storage 1031, and to store the new meta page in the first memory device 1020.

The memory controller 1010 may generate a new meta page, based on the meta data stored in the meta data storage 1031. The memory controller 1010 may newly generate a meta page including a head region and an additional meta data storage region. The newly generated meta page may have the same layout as the meta page temporarily stored in the read buffer 1032.

Figure 8:
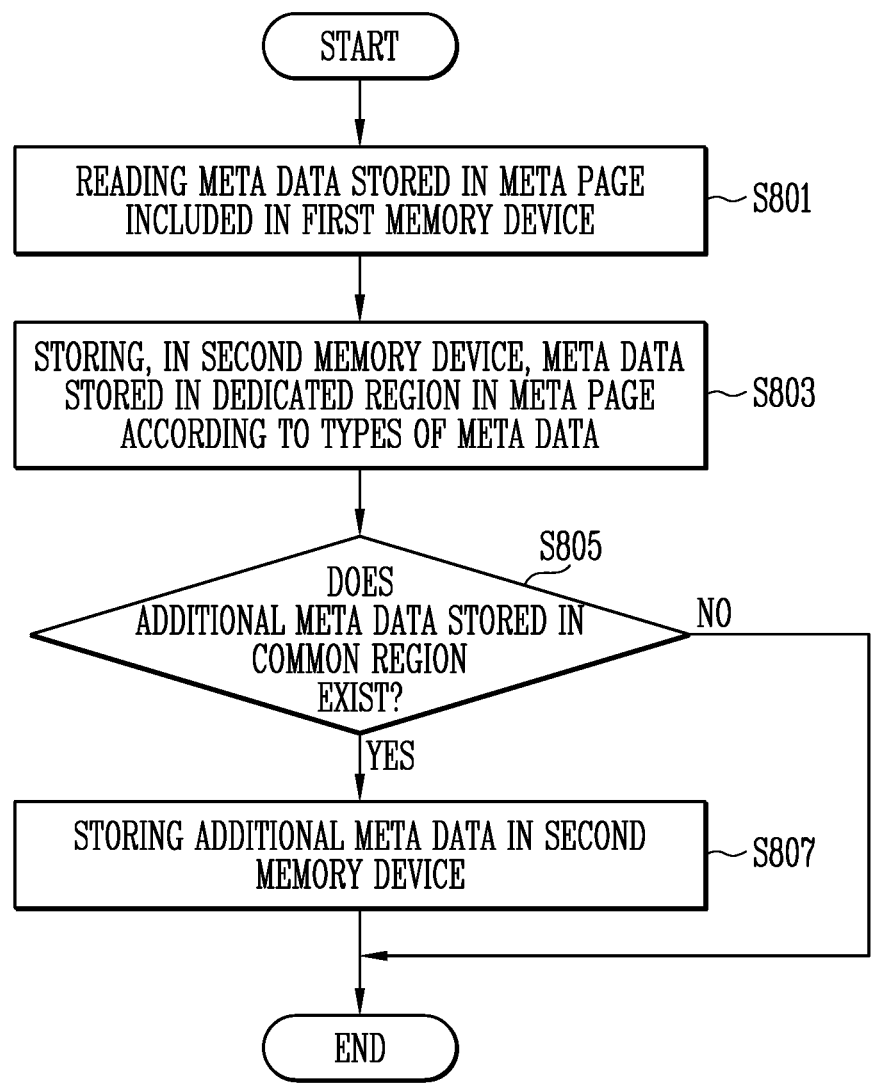
FIG. 8 is a flowchart for describing an operation of the memory controller in accordance with an embodiment of the present disclosure.

FIG. 8 is a flowchart for describing an operation of the memory controller 1010 in accordance with an embodiment of the present disclosure.

Referring to FIG. 8, in operation S801, the memory controller 1010 may control the first memory device 1020 to read meta data stored in a meta page included in the first memory device 1020. The memory controller 1010 may control the first memory device 1020 and the second memory device 1030 to temporarily store the read meta data in the read buffer 1032 in the second memory device 1030.

In operation S803, the memory controller 1010 may control the second memory device 1030 to store, in the meta data storage 1031, meta data stored in a dedicated region in the read meta page. Specifically, the memory controller 1010 may control the second memory device 1030 to store, in the meta data storage 1031, meta data stored in the meta page temporarily stored in the read buffer 1032. The memory controller 1010 may store the meta data stored in the meta page respectively in a first meta data storage, a second meta data storage, and a third meta data storage according to types of the meta data.

In operation S805, the memory controller 1010 may check whether any additional meta data stored in a common region exists. In accordance with an embodiment of the present disclosure, the memory controller 1010 may check information stored in a head region included in the common region. In accordance with another embodiment of the present disclosure, the memory controller 1010 may determine whether meta data have all been stored in a reserved region among meta data regions included in the dedicated region, and check the information stored in the head region. When no additional meta data stored in the common region exists, the memory controller 1010 may perform several operations in response to a request of the host 100, based on the meta data stored in the meta data storage 1031.

In operation S807, when additional meta data stored in the common region exists, the memory controller 1010 may control the second memory device 1030 to store, in the second memory device 1030, meta data stored in the common region. Specifically, the memory controller 1010 may control the second memory device 1030 to store the additional meta data in the meta data storage 1031 according to types of the additional meta data, based on the information stored in the head region of the meta page temporarily stored in the read buffer 1032. For example, the memory controller 1010 may calculate a size of the common region, based on size information stored in the head region. The memory controller 1010 may acquire address information of additional meta data, based on address information stored in the head region. Further, the memory controller 1010 may identify whether a page in which the additional meta data are stored is an effective meta page, based on effective information stored in the head region, and control the second memory device 1030 to store the additional meta data in the meta data storage 1031 according to types of the additional meta data.

In accordance with the present disclosure, there can be provided a memory system and an operating method thereof, which can store additional meta data regardless of the type of the additional meta data and use the stored meta data.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A memory system comprising:
a memory device including a plurality of memory blocks each including a plurality of pages; and
a memory controller configured to:
allocate, to a meta page among the plurality of pages, a first region including regions configured to store plural pieces of meta data respectively according to types of the plural pieces of meta data, and a second region configured to store additional meta data corresponding to at least one meta data among the plural pieces of meta data, and
control the memory device to store the plural pieces of meta data and the additional meta data in the first region and the second region, respectively,
wherein the second region includes:
an additional meta data storage region of which a size is determined based on the additional meta data corresponding to the plural pieces of meta data; and
a head region configured to store size information which is associated with the additional meta data, and
wherein the memory controller controls the memory device to store the additional meta data in the additional meta data storage region.

2. The memory system of claim 1, wherein the meta page is included in a meta data block among the plurality of memory blocks.

3. The memory system of claim 2, wherein memory cells included in the meta data block are configured with a Single Level Cell (SLC).

4. The memory system of claim 1, wherein the head region is further configured to store address information and effective information which are associated with the additional meta data.

5. The memory system of claim 4, wherein the size information indicates a size of the additional meta data storage region, and
wherein the address information includes at least one of a start address and an end address of a region in which the additional meta data are stored.

6. The memory system of claim 1, wherein a size of the head region is constant.

7. The memory system of claim 1,
wherein the head region is allocated in a direction toward a lowest address from a highest address among physical addresses corresponding to the meta page, and
wherein the additional meta data storage region is allocated in a direction toward a lowest address of the meta page from a lowest address of the head region.

8. The memory system of claim 1,
wherein the first region includes a plurality of meta data storage regions classified according to the types of the plural pieces of meta data, and
wherein other meta data storage regions except a meta data storage region adjacent to the second region among the plurality of meta data storage regions have a fixed size.

9. The memory system of claim 8, wherein sizes of the plurality of meta data storage regions are different from each other according to the types of the plural pieces of meta data.

10. The memory system of claim 1, wherein the first region is allocated in a direction towards a highest address from a lowest address among physical addresses corresponding to the meta page.

11. The memory system of claim 1, wherein the plural pieces of meta data include at least one of a read count, an erase count, map data, and a meta data log.

12. A memory system comprising:
a nonvolatile memory device including a meta page;
a read buffer configured to temporarily store plural pieces of meta data stored in the meta page;
a plurality of meta data storages configured to classify and store the plural pieces of meta data stored in the read buffer according to types of the plural pieces of meta data; and
a memory controller configured to control the nonvolatile memory device, the read buffer, and the plurality of meta data storages,
wherein the meta page includes:
a dedicated region configured to classify and store the plural pieces of meta data according to the types of the meta data; and
a common region configured to store additional meta data corresponding to the plural pieces of meta data stored in the dedicated region,
wherein the common region includes:
an additional meta data storage region configured to store the additional meta data corresponding to the plural pieces of meta data; and
a head region configured to store information which is associated with the additional meta data, and
wherein the memory controller is further configured to:
store, in the plurality of meta data storages, the plural pieces of meta data stored in the dedicated region of the meta page,
store the additional meta data stored in the common region of the meta page in meta data storages which are determined based on the information stored in the head region among the plurality of meta data storages, and
update the meta page based on the plural pieces of meta data stored in the plurality of meta data storages.

13. The memory system of claim 12, wherein the information associated with the additional meta data includes size information, address information, and effective information on the additional meta data.

14. The memory system of claim 13, wherein the memory controller is configured to update firmware based on the plural pieces of meta data stored in the plurality of meta data storages.

15. The memory system of claim 12,
wherein the dedicated region is allocated in a direction towards a highest address from a lowest address among physical addresses corresponding to the meta page, and
wherein the common region is allocated in a direction towards the lowest address from the highest address among the physical addresses corresponding to the meta page.

16. A method of operating a memory controller, the method comprising:
reading data stored in a meta page in a first memory device, the meta page including a dedicated region configured to store plural pieces of meta data and a common region configured to store additional meta data corresponding to the plural pieces of meta data, the common region including a head region configured to store information associated with the additional meta data and an additional meta data storage region;
storing the plural pieces of meta data stored in the dedicated region respectively in allocated regions, according to types of the plural pieces of meta data; and
storing the additional meta data stored in the additional meta data storage region included in the common region in the allocated regions which are determined based on the information stored in the head region, according to the types of the plural pieces of meta data.

17. The method of claim 16, wherein the plural pieces of meta data include at least one of map data, a meta data log, a read count, and an erase count.

18. The method of claim 16,
wherein the information associated with the additional meta data includes size information, address information, and effective information on the additional meta data, and
wherein the head region is allocated in a direction towards a lowest address from a highest address among physical addresses corresponding to the meta page.

19. The method of claim 16, wherein the storing of the additional meta data stored in the common region includes:
calculating a size of the common region, based on size information stored in the head region;
calculating a size of the additional meta data, based on address information stored in the head region; and
storing effective additional meta data in the allocated regions according to types of the effective additional meta data, based on effective information stored in the head region.

* * * * *